C. H. Perkins,

Horse Shoe Machine,

No. 1,424, Reissued Mar. 3, 1863.

C. H. Perkins,

Horse Shoe Machine,

No. 1,424. Reissued Mar. 3, 1863

C. H. Perkins,

Horse Shoe Machine,

No. 1,424 Reissued Mar. 3, 1863.

UNITED STATES PATENT OFFICE.

CHARLES H. PERKINS, OF PROVIDENCE, RHODE ISLAND.

IMPROVEMENT IN MACHINES FOR MAKING HORSESHOES.

Specification forming part of Letters Patent No. 20,441, dated June 1, 1858; Reissue No. 1,424, dated March 3, 1863.

*To all whom it may concern:*

Be it known that I, CHARLES H. PERKINS, formerly of Putnam, in the State of Connecticut, but now of the city and county of Providence, in the State of Rhode Island, have invented a new and useful Machine for Making Horseshoes; and I do hereby declare that the following specification, taken in connection with the drawings making a part of the same, is a full, clear, and exact description thereof.

Figure 1:
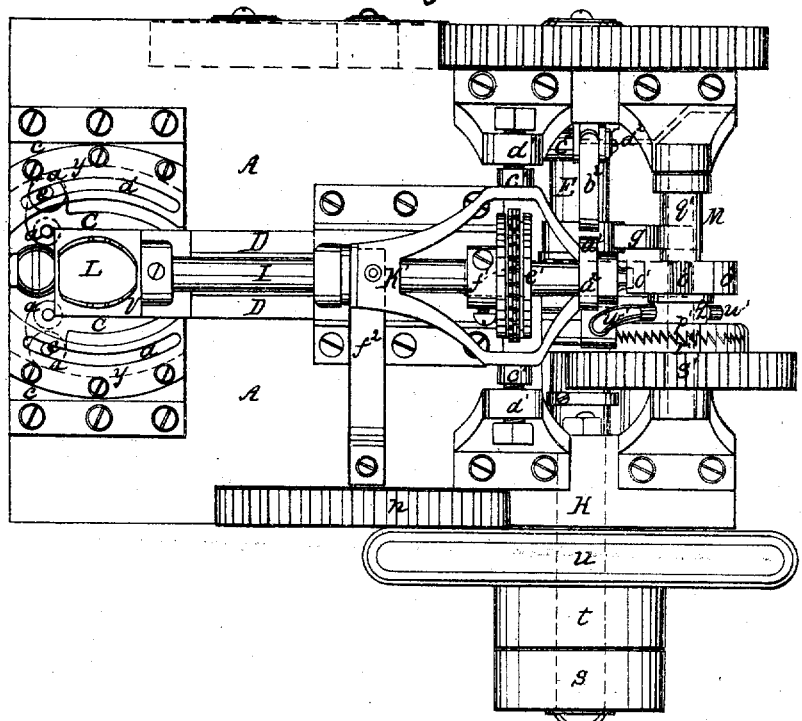
Figure 2:
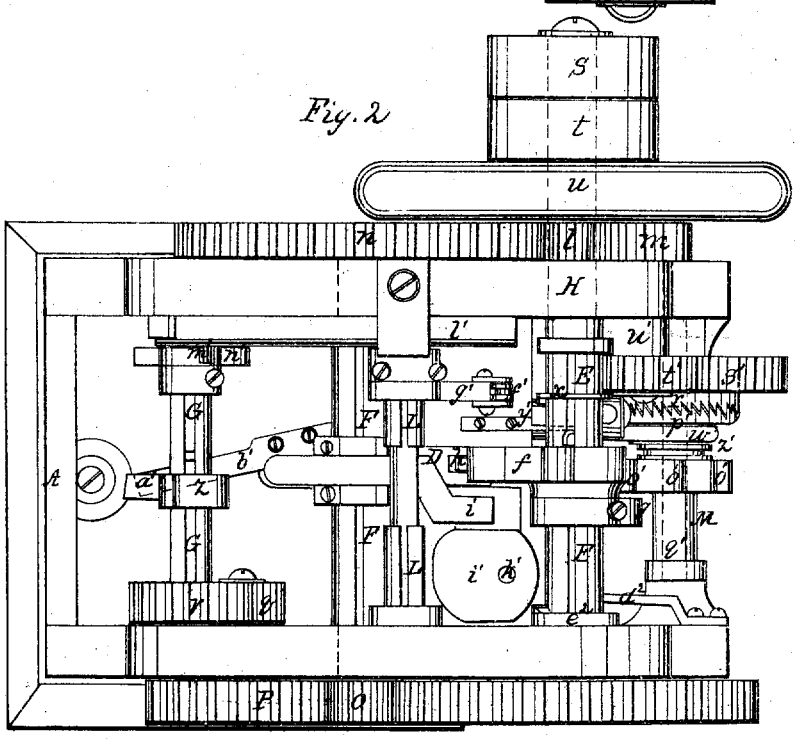
Figure 3:
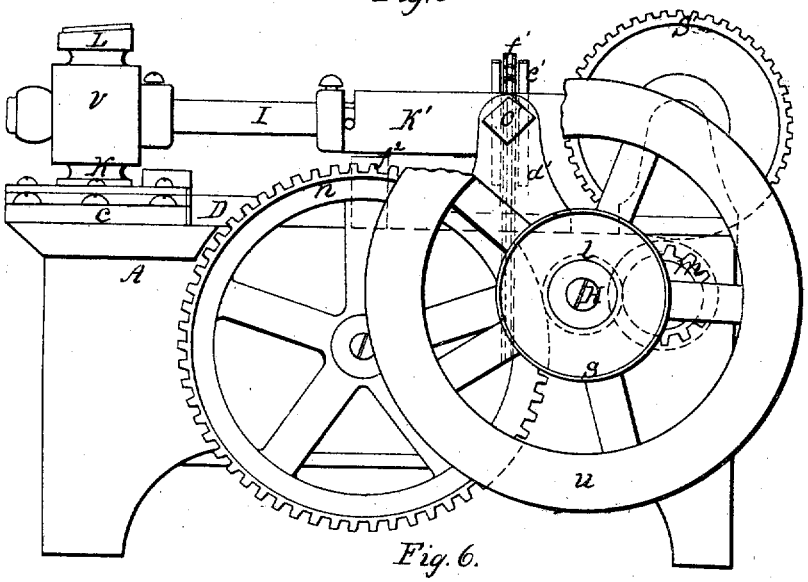
Figure 6:
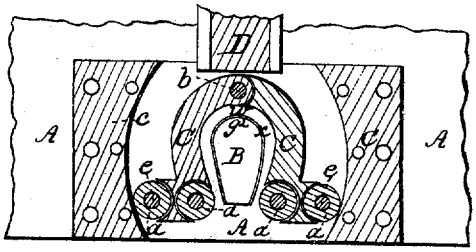
Figure 5:
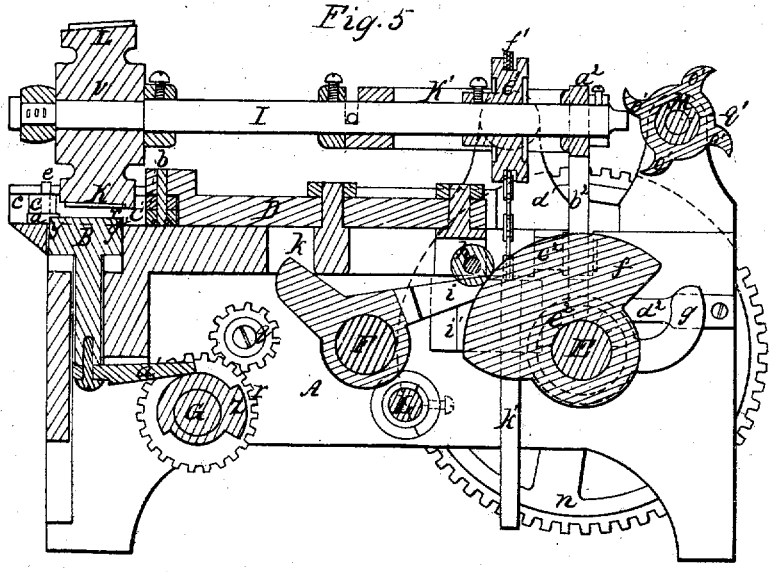
Figure 7:
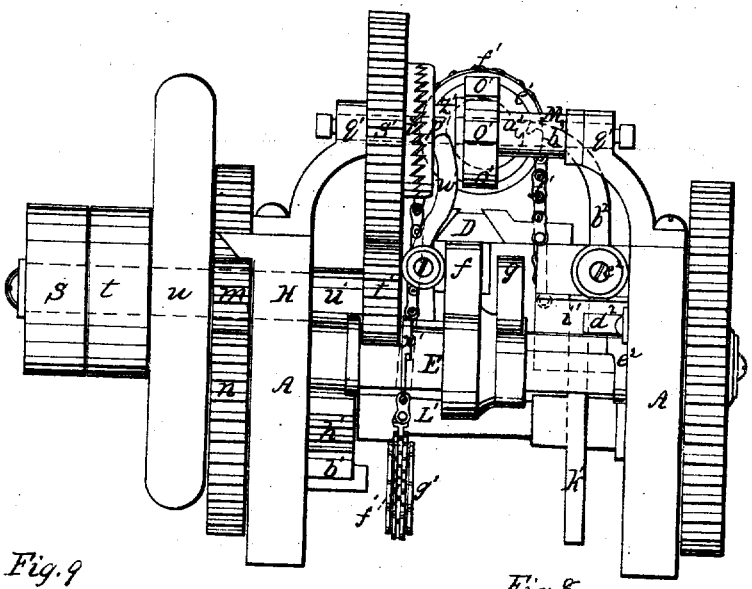
Figure 4:
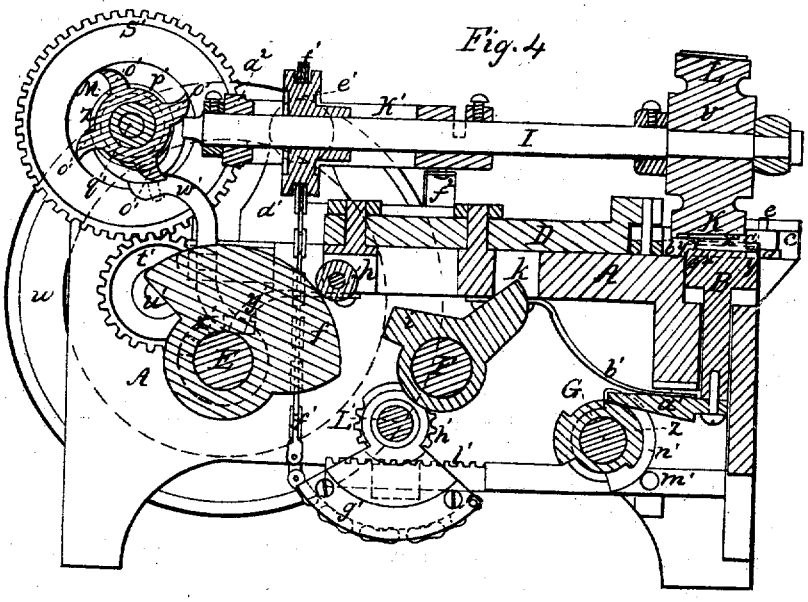

Figure 1 represents a top view. Fig. 2 represents a bottom view, and Fig. 3 represents a side elevation. Fig. 4 is a longitudinal and vertical section taken through the hammer-shaft, and so as to exhibit the parts in a direction toward the fly-wheel. Fig. 5 is a similar section, but made so as to represent the parts away from the fly-wheel. Fig. 6 is a horizontal section of the benders, their cams and slide, the same also showing the top of the former B, the bed, and the die *w*. Fig. 7 is a rear end elevation. Such other figures as may become essential to a correct description of the machine are hereinafter referred to.

The purpose of my invention is to produce a machine for making horseshoes which shall, while it gives form and shape to the shoe by means of dies, involve the principle of hammering the metal as it is being fashioned, and thereby increasing its density instead of pressing it into the form of a shoe between dies, as has heretofore universally been the case.

By means of the machine, which is represented in the drawings, a bar or piece of iron of the proper length may be bent, hammered, and creased in the form of a horseshoe, and with slight changes in the form and construction of some parts of the machine it can be made capable of producing shoes for oxen.

In the accompanying drawings, A represents the frame for supporting the operative parts of the machine. Near the front end of the table A, and arranged therein so as to slide vertically, is that part of the machine which I term the "former," it being shown at B in Figs. 2, 4, and 5, and in top view in Fig. 6. The next part of the machine is what I term the "benders," they being shown at C C as connected to a slider, D. These benders are curved arms, jointed at their rear ends to the slider D, and carrying rollers *a a* on their front ends. The anterior part of the slider, or that portion which is between the benders C C, is made with a straight surface, *b*, for forming on a horseshoe what is termed a "square toe." Stationary cams *c c*, affixed to the anvil or top of the bed A, and in positions as shown in Figs. 1, 3, 4, 5, and 6, govern the movement of the benders in lateral directions toward the shoe-blank, while such benders are being forced forward by their slider D. The lateral movements of the benders in opposite directions are effected by curved stationary grooves *d d*, into each of which a stud, *e*, from one of the benders enters. The longitudinal movements and intervals of rest of the bender-slider D are produced by the operation of two cams, *f g*. See Figs. 2, 4, 5, and 7, which are fixed on a horizontal and transverse shaft, E, one of them being made to act against a roller, *h*, fixed in the rear end of the slider D, and the other against one arm of a bent lever, *i*, which turns freely on another shaft, F, and has its other arm extended into a notch or recess, *k*, formed in the slide, as shown in Figs. 4 and 5.

G is a third shaft, which is situated near the front part of the table A, and with the other shafts E and F, receives rotary motion from a driving-shaft, H, by a train of gears, *m*, *n*, *o*, *p*, *q*, and *r*, arranged as shown in the drawings, the first of these gears being fixed on the shaft H, while the last is carried by the shaft G. A set of fast and loose pulleys, *s t*, and a fly-wheel, *u*, are applied to the driving-shaft.

Over the bed or table A is a tripping or hammer shaft, I, which at its front end carries a hammer, K, and a creaser, L, they being projected from a heavy head or block of metal, *v*, affixed to the shaft I, or arranged thereon as shown in the drawings.

Figure 9:
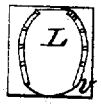
Figure 8:
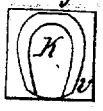

Figs. 8 and 9 exhibit separate views of the working-faces of the hammer and creaser. The object of the hammer is to reduce the shoe-blank to its requisite thickness. This it accomplishes with the aid of the bed or anvil, peculiarly constructed, as hereinfter described, together with the raised projection *w*, as shown in Fig. 6, for the purpose of causing the shoe to be made concave in rear of the toe. The purpose of the creaser is to form in the shoe the usual recesses and places for the nail-holes.

During the operation of the machine the hammer is made to strike several times on the shoe, after which the shaft I is turned around a semi-revolution, so as to bring the creaser underneath the hammer. This having been accomplished, the shaft is made to play up and down so as to hammer the shoe with the creaser, these operations being made to follow that of bending the shoe-blank about the "former" B, which is effected by the action of the bender after the shoe-blank has been placed in rear of, and with its middle against the said former. While the bending operation is taking place the former B should be in a position considerably raised above the surface of the anvil, in order that the vertical edge of the former may be presented to the shoe for the purpose of supporting its inner edge while the shoe is being formed by the benders. Soon after this has taken place the former B is depressed so as to leave the beveled top surface, *x*, only projecting above the top of the anvil, where it should remain while the shoe is being hammered and creased.

The benders C C, during the operations of hammering and creasing the shoe, remain in the position with reference to the former B, shown in Fig. 6, thereby forming a raised rim, against the inner vertical sides of which the outer edge of the shoe is fashioned under the blows of the hammer, which raised rim, together with the bed upon which the shoe rests, constitute the peculiarly-shaped anvil above referred to.

The purpose of the beveled top surface, *x*, is to cause the middle part of the shoe, or that part near the toe, to be spread out to a greater width than at the heels, and also to give the proper form to prevent it from balling with snow.

The mechanism for operating the former B consists not only of a cam, *z*, fixed on the shaft G, and made to work against a projection, *a'*, from the foot of the said former, but a spring, *b'*, which serves to depress such former. The tripping-shaft I is supported by and is capable of revolving axially in a rocker-frame, K', which turns on pivots C' C', projecting from two uprights, *d' d'*, arranged as shown in the drawings. Within the said frame K' is a grooved wheel, *e'*, which is fixed concentrically on the shaft I, and carries a chain, *f'*, in the groove of its periphery, one of the links of the chain being fastened to the periphery. This chain depends from a pulley, and has one end fastened to a sectoral arm, *g*, projecting from the shaft L', on which a pinion, *h'*, is fixed. To the other end of the chain a weight, *i'*, is fastened, such weight being made to slide on a vertical rod, *k'*, extended downward from the table A. The pinion *h'* engages with a slide-rack, *l'*, from which a stud, *m'*, projects, as shown in Figs. 2 and 4. A cam, *n'*, carried by the shaft G, operates against the said stud. The object of the wheel *e'*, the chain *f*, the sectoral arm *g'*, the pinion *h'*, the rack-bar *l'*, the cam *n'*, and weight *i'* is to effect the semi-rotative motions of the tripping-shaft at the proper times, in order to bring the hammer and creaser into operation alternately on the shoe-blank and at the times necessary.

The mechanism for tripping the shaft is as follows: A shaft, M, carrying a series of cams or wipers, *o' o' o'*, and one part, *p'*, of a clutch turns on another shaft, *q'*, and is arranged with respect to the rear end of the tripping-shaft, as seen in the drawings. The other part or half *r'* of the clutch is affixed to the side of a gear, *s'*, which is fixed on the shaft, *q'*, and receives motion from a pinion, *t*, attached to the inner end of a shaft, *u'*, whose outer end carries a gear, *m*, which engages with the gear or pinion *l* of the driving-shaft.

In connection with the said mechanism for tripping the shaft, I is a mechanism for clutching and unclutching the two shafts M and *q*. The same consists of a forked lever, *w'*, a cam, *x'*, and a spring, *y'*. The said forked lever plays at one end in the groove *z'* of the sliding part of the clutch. At its lower end it is borne against the cam by the spring, the cam being fixed on the shaft E.

The next portion of the machine is that for preventing the fall of the tripping-shaft or hammer-shaft long enough to allow of the semi-rotation of the hammer-shaft and the withdrawal of the made shoe from its place about the former B and the substitution of a shoe-blank for such shoe. The mechanism consists of a catch, $a^2$, fixed on and projecting from the rocker-frame K' of the tilting shaft a bent stop-lever, $b^2$, (turning on a fulcrum, $c^2$,) a spring, $d^2$, and a cam, *e'*, the whole being arranged as shown in the drawings. The cam is carried by the shaft E, and works the stop-lever in one direction, the spring serving to move it in the opposite direction. At a proper time the stop-lever is moved over the catch so as to latch it and hold the hammer-shaft up or prevent it from falling. During such times as the tilting cams are out of operation the finished shoe is removed from the dies and a new blank placed in position. The descent of the hammer-shaft is assisted by a spring, $f^2$, which is connected with it and the table, as shown in the drawings.

The general operation of the machine is as follows: A piece of bar-iron of sufficient size to form a shoe and heated, or not, as occasion may require, is placed in the space between the toe-die *b* and the former B. Soon after this has been done the benders C C will advance and bend the iron around the former. The former now descends so far as to leave the beveled portion *x* only above the surface of the anvil. The hammer-shaft is now tilted long enough for the hammer to plate out the shoe-blank to the required thickness, the outer edge of the shoe being formed against the inner edge of the benders, the benders with the anvil constituting in effect a die with a raised rim. The hammer-shaft is next rotated a half-revolution, so as to bring the creaser into operation. After the creasing of the shoe has been effected the tripping of the hammer-shaft is arrested and it is rotated a half-revolution, thereby bringing the hammer in position over the anvil. The finished shoe is now withdrawn, a second bar of iron placed in position as before, and the above-described operations are repeated. By providing the creaser with a small cutter at its toe it may be made to sever the shoe into two parts, so as to enable it to be used for oxen, provided such shoe be properly formed for such purpose, as it may be by changing the form of the dies.

I do not mean to limit myself to the precise construction and arrangement of the several parts, as described, but I mean to cover all formal variations, performing the same mode of operation by equivalent means.

What I claim as my invention, and desire to secure by Letters Patent, is—

1. The method, substantially as described, of making a shoe for animals by the combination of a pair of dies whose office shall be to act upon the whole exterior surface of the blank and fashion it into a shoe, as specified, one of said dies being an anvil-die, and the other a movable hammer-die, the two being so constructed and arranged relatively to each other as to fashion the shoe as set forth by striking a blow or a succession of blows upon the shoe-blank in distinction from the action of dies heretofore used for pressing the metal of the blank into the form of a shoe.

2. The combination and arrangement of the hammer K and the creaser L with one rotary tripping-shaft I, so as to be operated thereby substantially in the manner and for the purposes specified.

3. The mode of operation, substantially as specified, by means of which the former B is made to take two separate positions with respect to the benders and hammer for the purposes set forth.

4. Combining the straight toe-die *b* with the benders C C and the former B, substantially as described.

5. The combination of a set of notches or their equivalents with the rear end or toe of the former, substantially as described, for the purpose of maintaining the shoe-blank in its proper place with respect to the former during the process of bending the shoe.

6. In combination with the mechanism described for giving to the hammer-shaft a tilting motion, the mechanism described for rotating the shaft at the proper times in order to bring the hammer and the creaser to operate on the shoe alternately, substantially as described.

7. In combination with the mechanism for tilting and turning the hammer and creaser-shaft, the mechanism described for arresting the operations of the tilting mechanism and for preventing the fall of the hammer-shaft long enough to allow of a semi-rotation of the hammer-shaft and the withdrawal of the finished shoe from its place about the former and the substitution of a shoe-blank therefor.

In testimony whereof I have hereunto set my hand.

CHARLES H. PERKINS.

Witnesses:
JOHN GARTLAND,
H. J. SPOONER.